United States Patent [19]

Junginger

[11] Patent Number: 5,506,723
[45] Date of Patent: Apr. 9, 1996

[54] MULTISTAGE FIBER-OPTIC AMPLIFIER

[75] Inventor: Bernhard Junginger, Herrenberg, Germany

[73] Assignee: Alcatel N.V., Amsterdam, Netherlands

[21] Appl. No.: 201,245

[22] Filed: Feb. 24, 1994

[30] Foreign Application Priority Data

Feb. 26, 1993 [DE] Germany ............ 43 05 838.8

[51] Int. Cl.⁶ ............... H01S 3/13; H01S 3/091
[52] U.S. Cl. ............ 359/341; 359/134; 359/160; 372/6
[58] Field of Search ............... 359/341, 134, 359/160; 372/6

[56] References Cited

U.S. PATENT DOCUMENTS

| 5,050,949 | 9/1991 | DiGiovanni . | |
| 5,185,814 | 2/1993 | Healey | 359/341 |
| 5,253,104 | 10/1993 | Delavaux | 359/341 |

FOREIGN PATENT DOCUMENTS

| 0387075 | 9/1990 | European Pat. Off. . |
| 0459685 | 12/1991 | European Pat. Off. . |
| 0509577 | 10/1992 | European Pat. Off. . |
| 9205642 | 4/1992 | WIPO . |

OTHER PUBLICATIONS

Laming et al, IEEE Photonics Technology Letters, vol. 4, #12, 1992.
Bulow et al, IEEE Photonic Tech. Letters, vol. 4, #11, pp. 1287–1289, Nov. 1992 (abst. only provided herewith).
Bulow et al, Electronics Letters, vol. 28, #19, Sep. 10, 1992, pp. 1836–1837; abst. only provided herewith.
"Analog Video Distribution System with Three Cascaded 980 nm Single–Pumped EDFA's and 73 dB Power Budget" by Bülow et al., IEEE Photonics Technology Letters, vol. 4, No. 11, Nov. 1992, pp. 1287–1289.
"4.2 Million Subscribers with Cascaded EDFA–Distribution System for 35 TV AM–VSB Channels" by Bülow et al., Electronics Letters 10, Sep. 1992, vol. 28, No. 19, pp. 1836–1837.
"High Sensitivity Optical Pre–Amplifier at 10 Gbit/s Employing a Low Noise Composite EDFA with 46 dB Gain" by R. I.–Laming, et al, Optical Amplifiers and Applications, Technical Digest 1992, (Optical Society of America, Washington, D.C. 1992) vol. 17, pp. 58–61.
"Optische Nachrichtentechnik" by G. Grau, 2nd edition, Berlin, Heidelberg, New York, Tokyo, Springer–Verlag, 1986, pp. 286 and 296 to 302.
"High Sensitivity Optical Pre–Amplifier at 10 Gbit/s Employing A Low Noise Composite EDFA with 46 dB Gain" by R. I. Laming et al.
Optical Amplifiers and Their Applications, 1992 Technical Digest Series, IEEE–LEOS and OSA Photonics Reports.

*Primary Examiner*—Nelson Moskowitz
*Attorney, Agent, or Firm*—Ware, Fressola, Van Der Sluys & Adolphson

[57] ABSTRACT

In an optical receiver of the prior art, a multistage fiber-optic amplifier in which optical signal components propagating along different paths in the same direction beat with one another generate noise in addition to the noise due to spontaneous emission in the amplifier. A two-stage fiber-optic amplifier, according to the invention is provided in which a first section of optical fiber (F1) is pumped opposite to or in the direction of propagation of the optical signal and a second section of optical fiber (F2) is pumped in or opposite to the direction of propagation. A pump-light source (1), the sections of optical fiber (F1, F2), and couplers (K1, K2, K3) are arranged in such a way that any signal components propagating along different paths in the same direction will not beat with one another.

7 Claims, 4 Drawing Sheets

MULTISTAGE FIBER-OPTIC AMPLIFIER

TECHNICAL FIELD

The present invention relates to an amplification of an optical signal and more particularly an at least two-stage fiber-optic amplifier.

BACKGROUND OF THE INVENTION

Such fiber-optic amplifiers are known from, e.g., Laming, R. I., et al, "High Sensitivity Optical Pre-Amplifier at 10 Gbit/s Employing a Low Noise Composite EDFA with 46 dB Gain", Optical Amplifiers and Applications, Technical Digest 1992, (Optical Society of America, Washington D.C. 1992), Vol. 17, pages 58 to 61.

A two-stage fiber-optic amplifier is shown there whose amplifying sections of optical fiber are doped with erbium ions ($Er^{3+}$).

A signal having a wavelength of 1536 nm is amplified in two amplifier stages. The erbium ions are excited by a pump laser which emits pump light at a wavelength of 980 nm. After the first amplifier stage, the pump light is guided past an optical isolator by means of two wavelength-selective couplers. The optical oscillator blocks the light caused by amplified spontaneous emission (ASE) and travelling opposite to the direction of propagation of the signal. Pump light and signal then pass through the second amplifier stage, after which the amplified signal is available, which is fed to a receiver.

One disadvantage of this configuration is that in the receiver, particularly at high signal powers, noise is present in addition to the noise caused by spontaneous emission.

DISCLOSURE OF INVENTION

It is an object of the present invention to provide a fiber-optic amplifier which does not cause any additional noise in the receiver.

According to the present invention, an at least two-stage fiber-optic amplifier for amplifying an optical signal comprises a pump-light source for providing pump light, first and second sections of optical fiber doped with a rare-earth element, and first, second, and third wavelength-selective couplers serving to interconnect the sections of optical fiber and to connect the pump-light source with the sections of optical fiber, wherein the pump-light source, the sections of optical fiber, and the couplers are arranged to guide the pump light so that the first section of optical fiber is pumped in or opposite to the direction of propagation of the optical signal and then the second section of optical fiber is pumped opposite to or in the direction of propagation of the optical signal.

In further accord with the present invention, an at least two-stage fiber optic amplifier for amplifying an optical signal, comprises a pump-light source, first and second sections of optical fiber doped with a rare-earth element, first, second, and third wavelength-selective couplers serving to interconnect the sections of optical fiber and to connect the pump-light source with the sections of optical fiber, two optical fibers each provided between one output port of the second coupler and one input port of the third coupler, and means in one of said two optical fibers which pass light in only one direction, wherein the other one of said two optical waveguides contains means which prevent the optical signal from propagating in a direction from the second coupler to the third coupler.

According still further to the present invention, an at least two-stage fiber-optic amplifier for amplifying an optical signal, comprises a pump-light source which emits pump light, first and second sections of optical fiber doped with a rare-earth element, means which only pass light propagating in the direction from the first section of optical fiber to the second section of optical fiber, and first and second wavelength-selective couplers, wherein the pump light is divided into at least a first portion and a second portion by splitting means, and wherein the first and second portions are fed into the first coupler and second coupler, respectively, with the couplers located before or after the sections of optical fiber in the direction of propagation of the optical signal.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
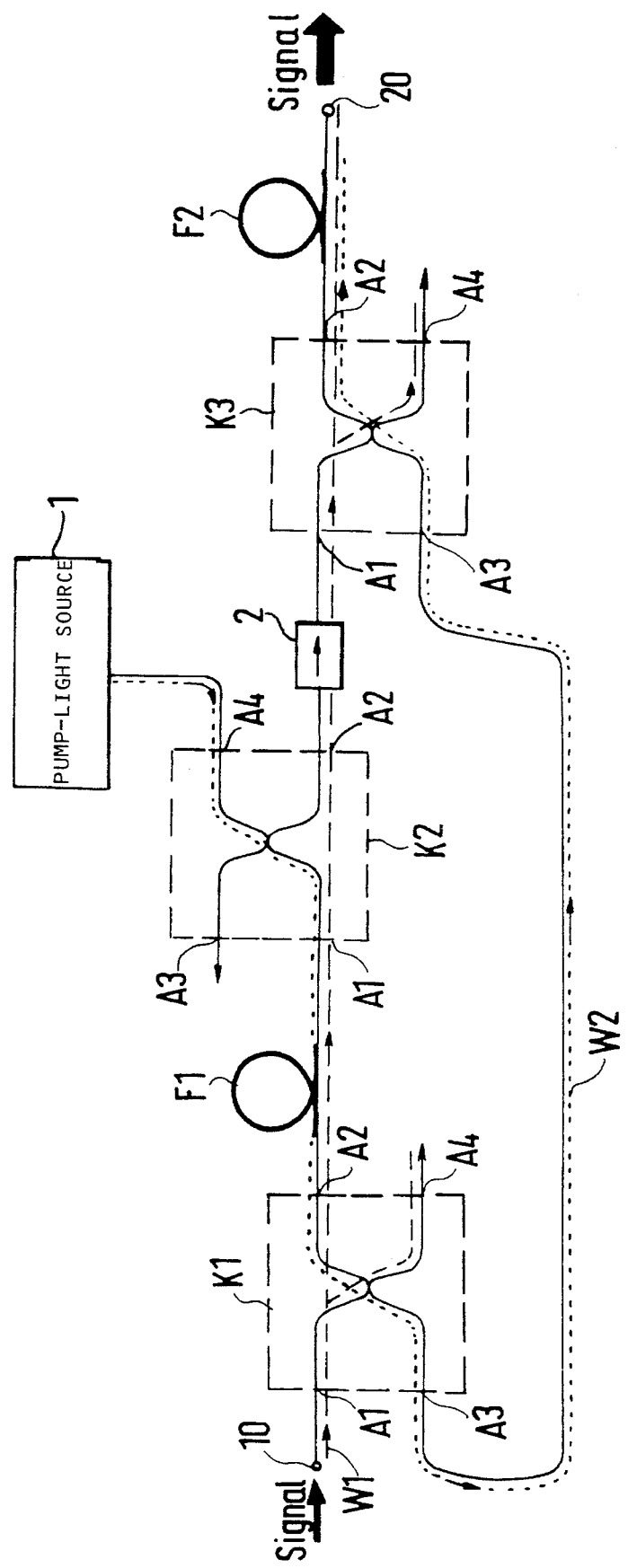
FIG. 1 shows a first embodiment of a two-stage fiber-optic amplifier in accordance with the invention.

A first embodiment of the present invention is shown in FIG. 1, and comprises three wavelength-selective couplers K1, K2, K3, two sections of optical fiber F1, F2 doped with a rare-earth element, such as erbium, a pump-light source 1 which may include a laser that emits light at a wavelength of 980 nm, and means 2 which pass light in only one direction. Such means are, for example, optical isolators or optical filters which can be used individually or in combination. The embodiments illustrated here use an optical isolator 2. Optical isolators and wavelength-selective couplers are known from Grau, G., "Optische Nachrichtentechnik", 2nd edition, Berlin, Heidelberg, New York, Tokyo, Springer-Verlag, 1986, pages 286 and 296 to 302. In FIG. 1, the direction of propagation of the optical signal to be amplified is such that the signal enters the fiber-optic amplifier through an input 10 and leaves the amplifier through an output 20. In FIG. 1 and in the other embodiments, the amplification of the optical signal is illustrated by differently sized arrows at the input 10 and output 20.

The optical isolator 2 blocks light which propagates opposite to the direction of propagation of the optical signal.

The couplers K1, K2, K3, the sections of optical fiber F1, F2, the optical isolator 2, and the pump-light source 1 are interconnected by optical fibers, so that the following arrangement and signal paths are obtained:

The first coupler K1 is followed by the first section of optical fiber F1, the second coupler K2, the third coupler K3, and the second section of optical fiber F2 in this order, each of the couplers having four ports A1–A4;

the optical signal to be amplified is fed to the first coupler K1 through the first port A1 and leaves this coupler through the second port A2, which is connected to the first section of optical fiber F1;

the amplified optical signal available after the first section of optical fiber F1 is fed to the second coupler K2 through the first port A1 and leaves this coupler through the second port A2, which is connected to the first port A1 of the third coupler K3. The amplified optical signal leaves the third coupler K3 through the second port A2, which is connected to the second section of optical fiber F2. After the second section of optical fiber F2, the amplified optical signal is available at the output 20 of the fiber-optic amplifier;

the pump light emitted by the pump-light source is fed into the second coupler K2 through the fourth port A4 and leaves this coupler through the first port A1, which is connected to the first section of optical fiber F1. The pump light then enters the first coupler K1 through the second port A2 and leaves this coupler through the third port A3. The third port A3 of the first coupler K1 is connected to the third port A3 of the third coupler K3. The pump light thus fed to the third coupler K3 leaves the latter through the second port A2, which is connected to the second section of optical fiber F2.

The propagation paths of the optical signal, path W1, and the pump light, path W2, are indicated in FIG. 1. The path W1 of the optical signal is shown by a dashed line. In the first and third couplers K1, K3, a division of the optical signal is indicated which is caused by nonideal couplers. The optical signal entering through the first ports A1 of the couplers K1, K3 is divided into a first, main portion, which exits through the respective second ports A2, and a second, lost portion, which exits through the respective fourth ports A4.

The second portion of the optical signal, which is coupled out in this embodiment, does not beat with the first, main portion.

The path W2 of the pump light is indicated by a dotted line.

The first section of optical fiber F1 is pumped opposite to the direction of propagation of the optical signal, i.e., the pump light leaves the second coupler K2 through the first port A1, passes through the first section of optical fiber F1, and enters the second port A2 of the first coupler K1. The pump light not used up by the pumping process is coupled out by the first coupler K1 and fed into the third coupler K3, which couples it into the second section of optical fiber F2. The second section of optical fiber F2 is thus pumped in the direction of propagation of the optical signal.

Figure 2:
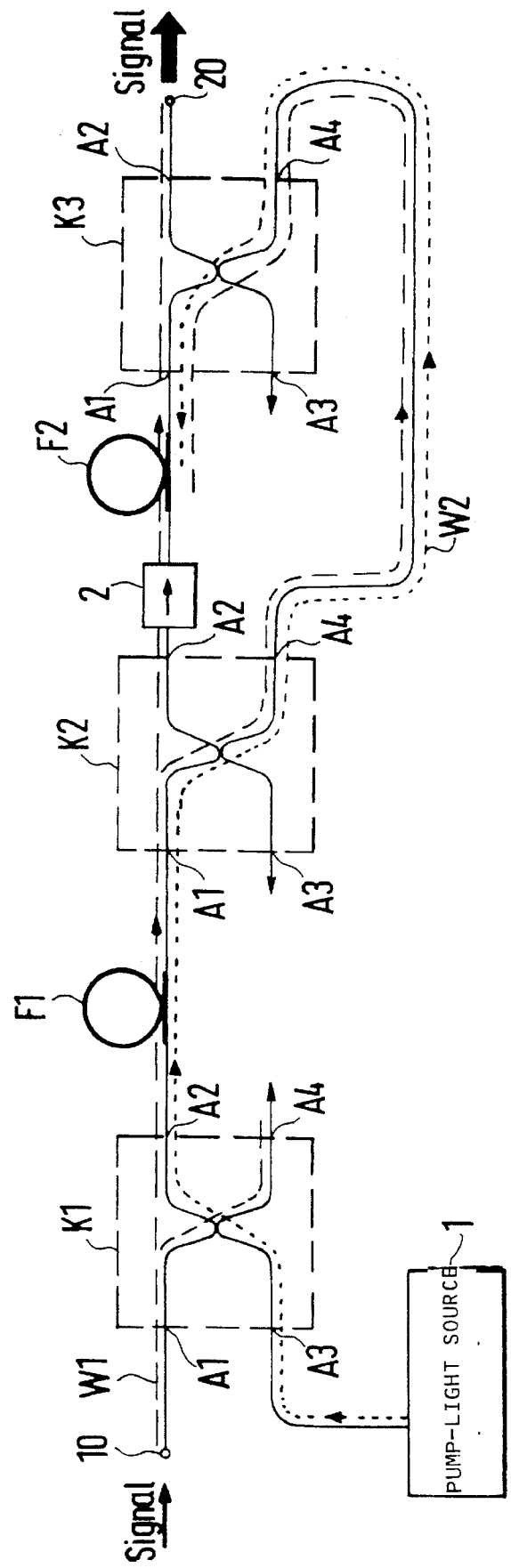
FIG. 2 shows a second embodiment of a two-stage fiber-optic amplifier in accordance with the invention.

The parts of the second embodiment, shown in FIG. 2, are similar to those of the embodiment of FIG. 1 and are designated by similar reference characters. Therefore, they will not be enumerated again.

The following arrangement and signal paths result:

The first coupler K1 is followed by the first section of optical fiber F1, the second coupler K2, the second section of optical fiber F2, and the third coupler K3 in this order, each of the couplers having four ports A1–A4;

the optical signal to be amplified is fed to the first coupler K1 through the first port A1 and leaves this coupler through the second port A2, which is connected to the first section of optical fiber F1;

the amplified optical signal available after the first section of optical fiber F1 enters the second coupler K2 through the first port A1 and leaves the second port A2. The amplified optical signal is coupled into the second section of optical fiber F2. It then enters the third coupler K3 through the first port A1, leaves the second port A2, and proceeds to the output 20 of the fiber-optic amplifier;

the pump light emitted by the pump-light source 1 enters the first coupler K1 through the third port A3 and leaves the second port A2, which is connected to the first section of optical fiber F1. The pump light is then fed into the first port A1 of the second coupler K2 and leaves the latter through the fourth port A4. The fourth port A4 of the second coupler K2 is connected to the fourth port A4 of the third coupler K3. The pump light thus fed into the third coupler K3 couples to the first port A1 of the third coupler K3, from which it is fed into the second section of optical fiber F2;

the optical isolator 2 is interposed between the second coupler K2 and the second section of optical fiber F2.

The propagation paths of the optical signal, path W1, and the pump light, path W2, are indicated in a similar manner as in FIG. 1.

As in FIG. 1, the first coupler K1 divides the optical signal into a first, main portion and a second, lost portion. This lost portion does not beat with the main portion.

The second portion of the optical signal which is coupled out by the second coupler K2 is superimposed on the first portion by the third coupler K3, but not in the same sense as the first portion.

The first section of optical fiber F1 is pumped in the direction of propagation of the optical signal; the pump light proceeds from the second port A2 of the first coupler K1 through the first section of optical fiber F1 to the first port A1 of the second coupler K2.

The second section of optical fiber F2 is pumped opposite to the direction of propagation of the optical signal, i.e., the pump light passes through the second section of optical fiber F2 from the first port A1 of the third coupler K3.

Figure 3:
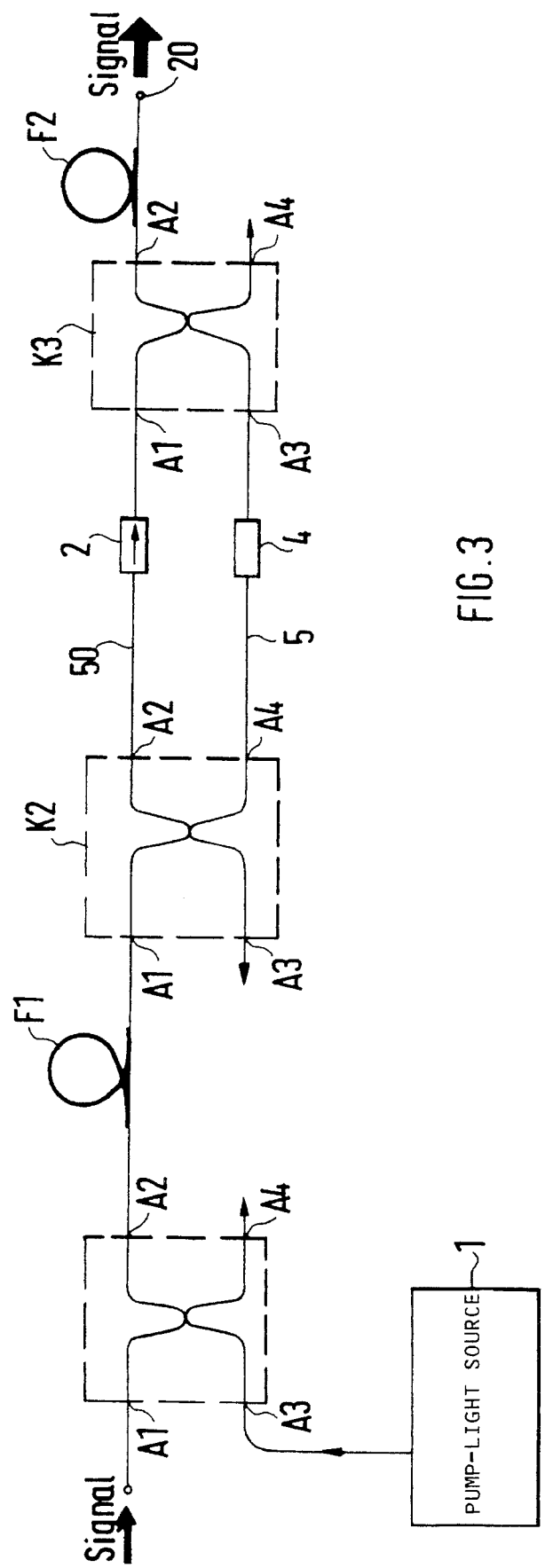
FIG. 3 shows a third embodiment of a two-stage fiber-optic amplifier in accordance with the invention.

A third embodiment, shown in FIG. 3, has a section of optical fiber 5 in addition to the parts shown in FIG. 1, which are designated by similar reference characters.

The following arrangement and signal paths result:

The first coupler K1 is followed by the first section of optical fiber F1, the second coupler K2, the third coupler K3, and the second section of optical fiber F2 in this order, each of the couplers having four ports A1–A4;

the optical signal to be amplified is fed to the first coupler K1 through the first port A1 and leaves the second port A2, which is connected to the first section of optical fiber F1;

the amplified optical signal available after the first section of optical fiber F1 enters the second coupler K2 through the first port A1, leaves the second port A2, and is fed to the third coupler K3 through the first port A1. It leaves the third coupler K3 through the second port A2 and is coupled into the second section of optical fiber F2, after which it is available at the output 20 of the fiber-optic amplifier;

the second port A2 of the second coupler K2 and the first port A1 of the third coupler K3 are interconnected by an optical fiber 50 containing an optical isolator 2;

the fourth port A4 of the second coupler K2 and the third port A3 of the third coupler K3 are interconnected by the optical fiber 5, which contains means 4 for preventing the propagation of the optical signal;

the pump light emitted by the pump-light source 1 is fed to the first coupler K1 through the third port A3 and leaves the second port A2, which is connected to the first section of optical fiber F1. The pump light is then fed into the first port A1 of the second coupler K2 and leaves the latter through the fourth port A4. Via the optical fiber 5 it is fed into the third port A3 of the third coupler K3, which it leaves through the second port A2 to enter the second section of optical fiber F2.

According to the invention, the means 4 inserted in the optical fiber 5 is designed to prevent the second portion of the optical signal, which is coupled out via the second coupler K2, from propagating. Such a means is, for example, a fiber filter having a band-stop response, i.e., the band-stop response characteristic is chosen so that the wavelength of the optical signal is blocked. It is also possible to choose the fiber filter so that only the wavelength of the pump light is passed.

Alternatively to the use of a fiber filter, the means 4 may be implemented with optical lenses and optical filters, such as etalons.

The means 4 block the second portion of the optical signal, so that this portion cannot beat with the first, main portion.

Figure 4:
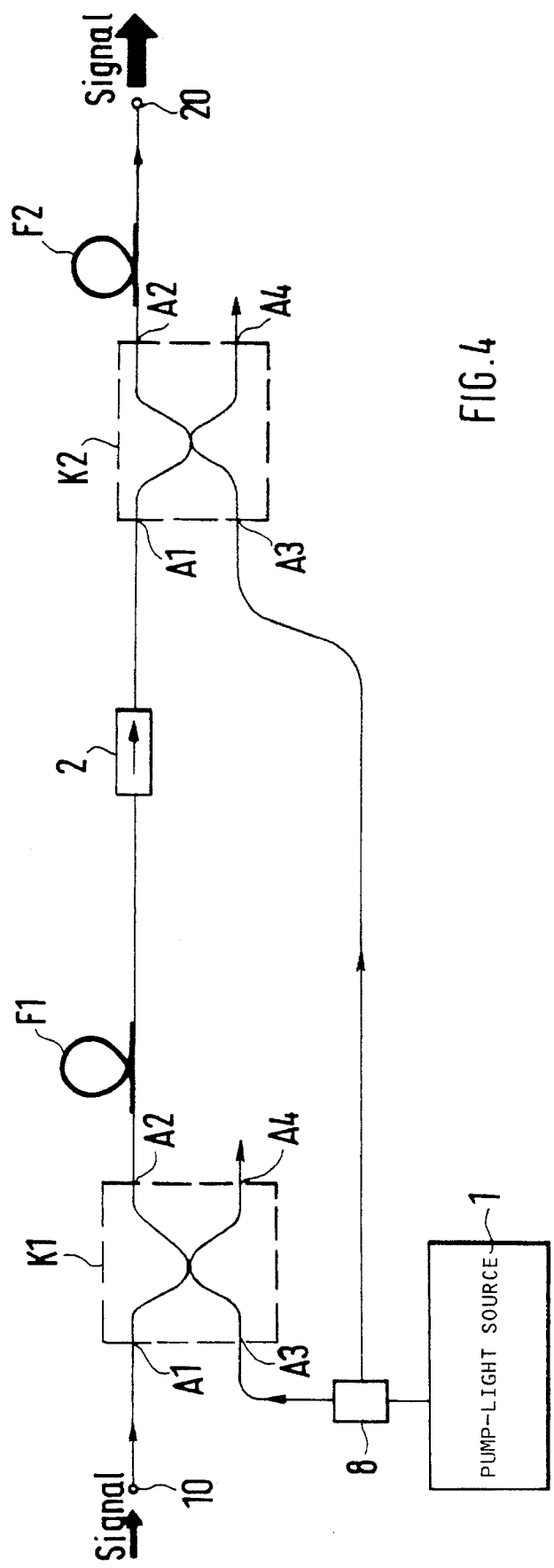
FIG. 4 shows a fourth embodiment of a two-stage fiber-optic amplifier in accordance with the invention.

A fourth embodiment is shown in FIG. 4. It has a pump-light source 1, first and second couplers K1, K2, first and second sections of optical fiber F1, F2, an optical isolator 2, and splitting means 8. The splitting means 8 is designed to divide the pump light emitted by the pump-light source 1 into, e.g., two portions. This is done, for example, with a coupler which divides the input power into two equal parts. It is also possible to use a beam splitter. These possibilities are shown in the above-mentioned book by Grau, G.

The optical signal is fed into the first port A1 of the first coupler K1 and leaves the second port A2 in order to be guided to the first section of optical fiber F1. The amplified optical signal passes through the optical isolator 2 and is fed into the first port A1 of the second coupler K2, which it leaves through the second port A2 in order to be guided to the second section of optical fiber F2. After the second section of optical fiber F2, the amplified optical signal is available at the output 20.

The splitting means 8 divide the emitted pump light into two parts. One part is fed into the third port A3 of the first coupler K1, and the other part is fed into the third port A3 of the second coupler K2.

In this embodiment, the couplers are arranged so that the pump light is fed into the sections of optical fiber in the direction of propagation of the optical signal (copropagating configuration). It is also possible to feed the pump light into the sections of optical fiber in a direction opposite to the direction of propagation of the optical signal (counterpropagating configuration). A combination of these two possibilities is also possible.

Since the pump light is divided into two or more parts, a multistage fiber-optic amplifier is provided which requires only one pump-light source.

In fiber-optic transmission systems, fiber-optic amplifiers serve to amplify optical signals. This is necessary since the optical signals are attenuated by the optical fiber. Amplification is also necessary if the optical signals are distributed in a distribution system. A fiber-optic transmission system has at least one optical transmitter, one transmission link, and one optical receiver. A photodiode contained in a receiver receives both the signal light and the light caused by amplified spontaneous emission (ASE) in the fiber-optic amplifier. This light causes a noise signal in the photodiode. In addition to this noise signal, noise is present which will be explained in the following:

In the prior art referred to above, the pump light is guided past the optical isolator between the first and second amplifier stages by means of two wavelength-selective couplers. The coupler ahead of the optical isolator couples out the pump light and, being not ideal, a portion of the signal to be amplfied. The coupler following the optical isolator recombines the pump light and the portions of the optical signal. Thus, there is a first portion of the optical signal to be amplified, which passes through the optical isolator, and a second portion, which is guided past the optical isolator. Between these two portions of the signal light, a phase difference exists. It results from the fact that the paths traversed by the two portions differ in length. A path-length difference is due to the fact that in practice the two paths cannot be made equally long.

A photocurrent $I_{Ph}$ generated in the photodiode is proportional to the incident light power $P_L$, and the latter is proportional to the square of the electric field strength E of the signal, i.e., $I_{Ph} \sim P_L \sim (E)^2$.

If the portion of signal light which passes through the optical isolator has an electric field strength $E_1$, and the portion guided past the optical isolator has an electrical field strength $E_2$, the total field strength E arriving at the photodiode is $E = E_1 + E_2$.

By squaring E, a term $2.E_1.E_2$ is obtained, which is the cause of the additional noise. If the light powers to be transmitted are low, the problem caused by the terms is negligible. At higher light powers and with the use of sensitive optical receivers, however, the problem is aggravated.

In the embodiments described, this problem no longer arises. The pump-light sources are so arranged and the wavelength-selective couplers are so connected with one another that signal components which propagate between the input 10 and output 20 of the fiber-optic amplifier along different paths in the same direction will not beat with one another.

In the third embodiment, there is no such beating, either, since the second portion of the optical signal is prevented from propagating.

In the fourth embodiment, the problem described does not arise since the pump light is fed into each section of optical fiber directly. No disturbing division into a first, main portion and a second portion takes place.

While the invention has been described in connection with a two-stage fiber-optic amplifier, it is to be understood that this description is made only by way of example, i.e., that more than two stages of amplification may be implemented without departing from the spirit scope of the invention. All components of the fiber-optic amplifier illustrated are discrete components; it is also possible to integrate all or a few of the components.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An at least two-stage fiber-optic amplifier for amplifying an optical signal, comprising:

a pump-light source for providing pump light, first and second sections of optical fiber doped with a rare-earth element, and first, second, and third wavelength-selective couplers serving to interconnect the sections of optical fiber and to connect the pump-light source with the sections of optical fiber, wherein the pump-light source, the sections of optical fiber, and the couplers are arranged to guide the pump light so that first the first section of optical fiber is pumped in or opposite to the direction of propagation of the optical signal and then the second section of optical fiber is pumped opposite to or in the direction of propagation of the optical signal, and wherein the pump-light source, the sections of optical fiber, and the couplers are arranged to prevent optical-signal components which propagate between an input and an output of the fiber-optic amplifier along different paths in the same direction from beating with one another.

2. An at least two-stage fiber-optic amplifier as claimed in claim 1, wherein the couplers and the sections of optical fiber, into which the optical signal and the pump light emitted by the pump-light source are fed, are arranged as follows:

the first coupler is followed by the first section of optical fiber, the second coupler, the third coupler, and the second section of optical fiber in this order, each of the couplers having first, second, third, and fourth ports, and wherein the optical signal and the pump light are routed as follows:

the optical signal to be amplified is provided via the first and second ports of the first coupler into the first section of optical fiber;

an amplified optical signal available after the first section of optical fiber is provided via the first and second ports of the second coupler and then via the first and second ports of the third coupler into the second section of optical fiber, after which the amplified optical signal is available at an output of the fiber-optic amplifier, and the pump light is fed via the fourth and first ports of the second coupler into the first section of optical fiber, then via the second and third ports of the first coupler, and then via the third and second ports of the third coupler into the second section of optical fiber.

3. An at least two-stage fiber-optic amplifier as claimed in claim 1, wherein the couplers and the sections of optical fiber, into which the optical signal and the pump light emitted by the pump-light source are provided, are arranged as follows:

the first coupler is followed by the first section of optical fiber, the second coupler, the second section of optical fiber, and the third coupler in this order, each of the couplers having first, second, third, and fourth ports, and wherein the optical signal and the pump light are routed as follows:

the optical signal to be amplified is provided via the first and second ports of the first coupler into the first section of optical fiber;

the amplified optical signal available after the first section of optical fiber is provided via the first and second ports of the second coupler into the second section of optical fiber;

an amplified optical signal available after the second section of optical fiber is routed via the first and second ports of the third coupler to the output of the fiber-optic amplifier, and the pump light is fed via the third and second ports of the first coupler into the first section of optical fiber, then via the first and fourth ports of the second coupler, and then via the fourth and first ports of the third coupler into the second section of optical fiber.

4. An at least two-stage fiber-optic amplifier as claimed in claim 2, wherein between the second and third couplers, means are provided which pass light in only one direction.

5. An at least two-stage fiber-optic amplifier as claimed in claim 3, wherein between the second coupler and the second section of optical fiber, means are provided which pass light in only one direction.

6. An at least two-stage fiber-optic amplifier for amplifying an optical signal, comprising: a pump-light source, first and second sections of optical fiber doped with a rare-earth element, first, second, and third wavelength-selective couplers serving to interconnect the sections of optical fiber and to connect the pump-light source with the sections of optical fiber, two optical fibers each provided between one output port of the second coupler and one input port of the third coupler, and means in one of said two optical fibers which pass light in only direction, wherein the other one of said two optical fibers contains means which prevent the optical signal from propagating in a direction from the second coupler to the third coupler.

7. An at least two-stage fiber-optic amplifier for amplifying an optical signal, comprising: a pump-light source which emits pump light, first and second sections of optical fiber doped with a rare-earth element, means which only pass light propagating in the direction from the first section of optical fiber to the second section of optical fiber, and first and second wavelength-selective couplers, wherein the pump light is divided into at least a first portion and a second portion by splitting means, and wherein the first and second portions are fed into the first coupler and second coupler, respectively, with the couplers located before or after the sections of optical fiber in the direction of propagation of the optical signal.

* * * * *